US006904653B2

(12) United States Patent
Bates

(10) Patent No.: US 6,904,653 B2
(45) Date of Patent: Jun. 14, 2005

(54) FAUCET SEAL AND SPRING TOOL

(76) Inventor: Wendell P. Bates, 1765 Johnson School Rd., Thaxton, VA (US) 24174

( * ) Notice: Subject to any disclaimer, the term of this patent is extended or adjusted under 35 U.S.C. 154(b) by 0 days.

(21) Appl. No.: 10/618,890

(22) Filed: Jul. 14, 2003

(65) Prior Publication Data

US 2004/0020022 A1 Feb. 5, 2004

Related U.S. Application Data

(60) Provisional application No. 60/395,489, filed on Jul. 12, 2002.

(51) Int. Cl.[7] .................................................. B23P 19/02

(52) U.S. Cl. ............................................ 29/235; 29/225

(58) Field of Search .......................... 29/235, 255, 270, 29/280, 263, 278, 268

(56) References Cited

U.S. PATENT DOCUMENTS 1,518,222 A * 12/1924 Sather ........................ 81/3.29
5,097,580 A * 3/1992 Story ........................ 29/221.5
5,299,347 A * 4/1994 Decker ........................ 29/235
6,012,209 A * 1/2000 Whetstone .................. 29/235
6,574,843 B1 * 6/2003 Meadows .................. 29/33 N

* cited by examiner

*Primary Examiner*—Lee D. Wilson
(74) *Attorney, Agent, or Firm*—Kimberly A. Chasteen

(57) ABSTRACT

A simplified tool for removing and inserting a plumbing fixture seal, particularly for use with ball type faucets using a rubber seal engaged by a cylindrical compression spring. The tool comprises an outer housing; an inner member having a tapered end designed to frictionally engage the seal and spring, the member being reciprocally disposed within the outer housing, the inner member being retracted inside the outer housing by a retraction spring; and a mechanism for extending the tapered end of the inner member beyond the end of the outer housing sufficient to engage the seal and spring.

3 Claims, 4 Drawing Sheets

Figure 1 - Prior Art

FAUCET SEAL AND SPRING TOOL

CROSS REFERENCE TO RELATED APPLICATION

The present application claims priority from U.S. Provisional Application Ser. No. 60/395,489, filed Jul. 12, 2002.

FIELD OF THE INVENTION

The disclosed invention relates to a tool for removing and inserting a plumbing fixture seal. In particular, the present invention relates to a simple device for replacing a worn seal or spring in a faucet.

DESCRIPTION OF RELATED ART

Modern plumbing fixtures include a seal structure which controls the flow of fluid and, when functioning properly, prevents flow completely in the off position. If the seal structure fails, the fixture will leak and replacement of the seal is necessary.

The seal structure generally consists of a small, cylindrical, open-ended rubber seal and a small spring. The rubber seal may crack or break or the springs may lose their memory and fail to perform as intended, causing the faucet to leak. Replacement of this seal normally resolves the leak but is difficult because of the small size of the seal structure and the small area in which the structure is located. Normally, both the seal and the spring are replaced simultaneously.

Previous methods for replacing the seal structure involve the use of tools not designed for this situation. The use of screwdrivers and other long tools is common in the industry since the location of the worn seal structure is not easily accessible. Additionally, this repair does not lend itself to completion by hand since there is not sufficient room in most faucets for an adult's fingers.

More complex tools, such as the device disclosed by U.S. Pat. No. 5,299,347 ('347), provide for the retraction of an inner member into an outer housing to disengage a seal and spring frictionally connected to the tapered tip of the inner member. This design is complicated and difficult to use.

Accordingly, it is an object of the present invention to provide a tool for removing and installing a seal structure in a plumbing fixture.

It is another object of the present invention to provide a tool which is convenient and easy to use.

It is yet a further object of the present invention to provide a tool which has a simple design which is reusable.

Finally, it is an object of the present invention to accomplish the foregoing objectives in a simple and cost effective manner.

SUMMARY OF THE INVENTION

A faucet and spring tool utilized to remove and replace the seal and spring from a faucet valve assembly. The device consists of a cylindrical, hollow external housing having upper and lower ends and a cylindrical guide having upper and lower ends and designed to be removably disposed within the external housing such that the lower end of the guide does not extend beyond the lower end of the external housing in a resting position. A cap is removably attachable to the upper end of the cylindrical guide such that the cap extends beyond the upper end of the external housing in a resting position. A compression spring having upper and lower ends is disposed within the upper end of the external housing such that depression of the cap causes compression of the spring which further causes the lower end of the cylindrical guide to extend beyond the lower end of the external housing. The lower end of the compression spring is held in place by an area of reduced internal diameter in the external housing. The cylindrical guide includes a lip which interacts with an area of reduced internal diameter in the external housing to prevent the cylindrical guide from sliding past a predetermined location. The cap is either pressure fit to or threaded onto the upper end of the cylindrical guide. The external housing includes stationary grip handles which are preferably formed integrally with the external housing and which preferably are curved to accept a user's fingers. The external housing, the cap and the cylindrical guide are preferably formed from a water resistant or waterproof material, such as a plastic, composite or a thermoplastic.

ELEMENT LIST

Figure 1:
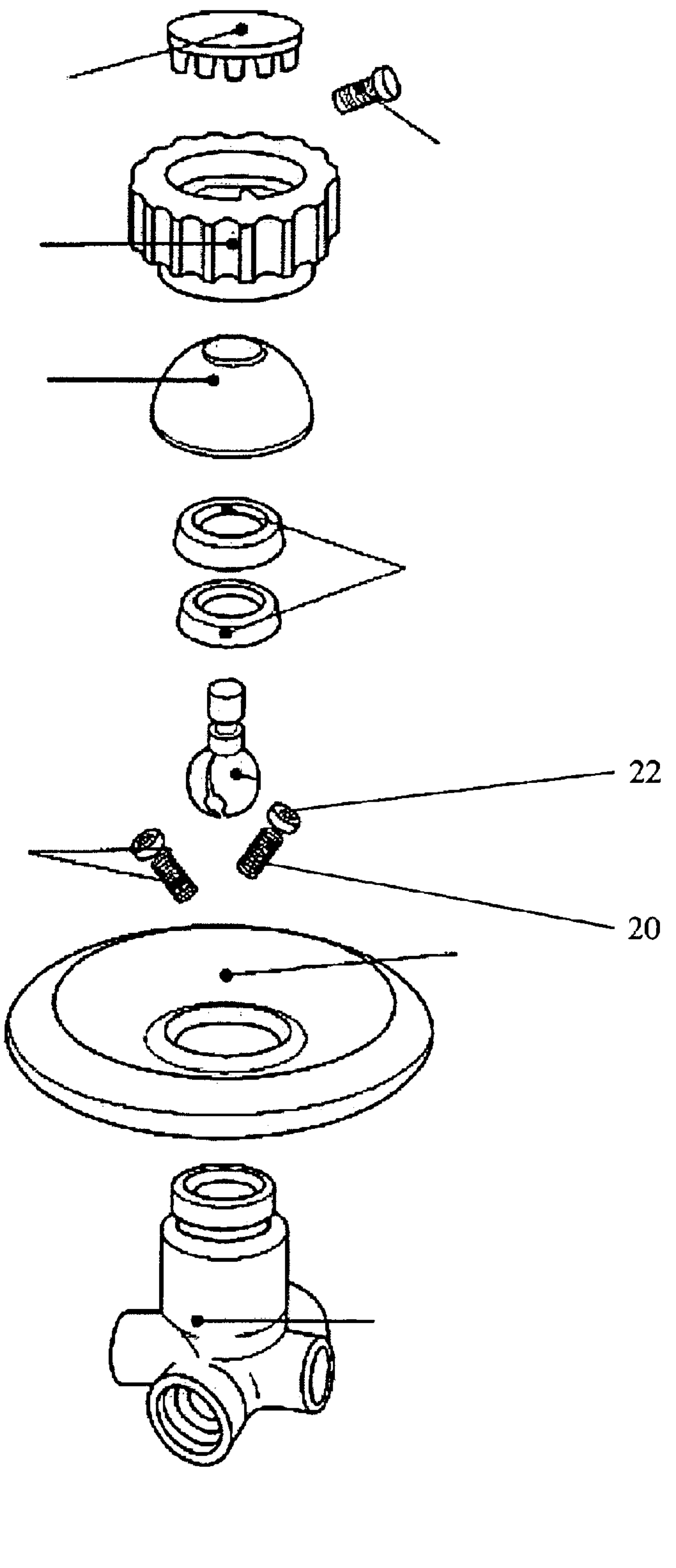
FIG. 1 shows the structure, existing in the prior art, which is repaired using the present invention.

20 faucet spring
22 faucet seal
24 grip handles
26 external housing
28 spring
**30/30*a*** central cylindrical guide
**32/32*a*** guide cap
34 internal surface of upper portion of external housing
36 compression surface for spring
38 internal surface of external housing
40 internal surface of external housing
42 guide lip

DETAILED DESCRIPTION OF THE PREFERRED EMBODIMENT

The spring 20 and seal 22, shown in FIG. 1, are located in a predetermined location in the faucet that is difficult to remove and replace without great difficulty because of the small size of the spring 20 and seal 22 and the constrictions of the location. This is most notable in a bathtub faucet when the seal 20 and spring 22 require replacement. The faucet assembly is usually located in a vertical position and keeping the seal 22 and spring 20 in place while removing or inserting them is challenging. The present invention allows the old seal 22 and spring 20 to be removed together and replaced with a new seal 22 and spring 20 in unison while maintaining correct location placement.

A standard faucet valve assembly has a valve body with a main bore and a counterbore inlet passageway leading from a supply of water. The counterbore holds a tubular seal (seal 22 and spring 20) element in the inlet passageway of the valve body. The present invention enables the user to remove both the worn seal 22 and spring 20 together and replace a new seal 22 and spring 20 together. The spring 20 generally used in the industry is a frustoconical configuration with a smaller upper end, which engages the seal 22 and urges it against the valving member. The larger diameter of the conical spring 20 engages an annular shoulder of the counterbore. The seal 22 generally consists of a rubber or rubber-like composition with a through bore diameter that is comparable in size to the small end of the conical spring 20.

Figure 2:
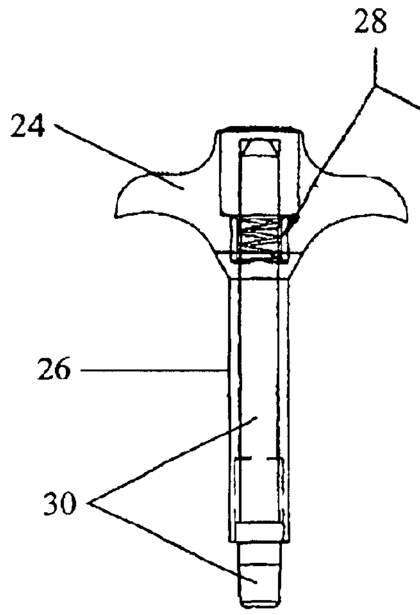
FIG. 2 is a cross sectional view of the preferred embodiment of the present invention taken along the longitudinal center of the device, with the device in its actuated position.

FIG. 2 shows the preferred embodiment of the present invention. As shown, the device is generally cylindrical with stationary grip handles 24 which extend from the sides of the device. These grip handles 24 preferably extend directly opposite from each other such that they can be easily gripped by the user's fingers. For further ease of use, the grip handles 24 may be curved to provide a comfortable and secure location for the user's fingers.

The grip handles 24 are an integral part of the external housing 26 of the device. The housing 26 is cylindrical and hollow with varying internal diameters. The upper portion of the housing 26 is designed to accept a spring 28 through an opening in the top of the housing 26 and maintain the spring 28 in the upper portion of the housing 26 due to a smaller internal diameter, as discussed below and shown in more detail in FIG. 9.

The device further consists of a central cylindrical guide 30. This guide 30 is placed inside the external housing 26 and is designed to slide within the external housing 26 as needed. The external housing 26 includes varying internal diameters which work in conjunction with varying external diameters on the guide 30 to control movement of the guide within the external housing 26. The lower end of the guide 30 is preferably tapered to facilitate removal and replacement of the spring 20 and seal 22 in a fixture. The upper end of the guide 30 is designed to accept a cap 32. The cap 32 includes a central indentation in the lower surface. In the preferred embodiment shown in FIGS. 2, 3, 8 and 11, the cap 32 is pressure fit to the upper end of the guide 30. In an alternate embodiment shown in FIGS. 4, 5, 7 and 10 the inner surface of the indentation in the lower surface of cap 32*a* is threaded and mates with threads on the outer surface of the upper end of guide 30. Any connection means can be used to connect the cap 32 to the guide 30 so long as pressure on the cap 32 forces the guide 30 to slide downwards within the external housing 26.

Figure 3:
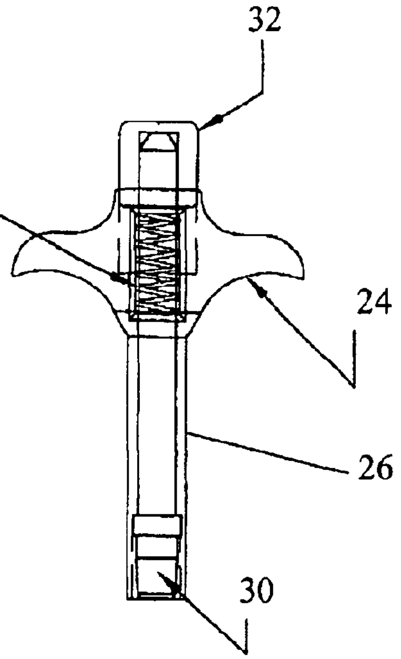
FIG. 3 is a cross sectional view of the preferred embodiment of the present invention taken along the longitudinal center of the device, with device in its resting position.
Figure 5:
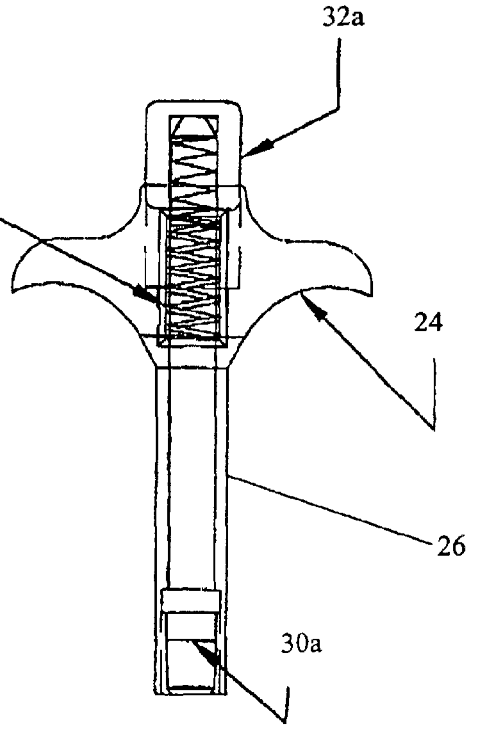
FIG. 5 is a cross sectional view of an alternate embodiment of the present invention taken along the longitudinal center of the device, with device in its resting position.
Figure 6:
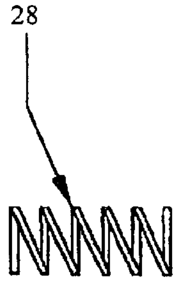
FIG. 6 is a side view of the spring of the present invention.
Figure 7:
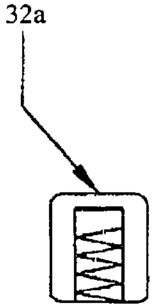
FIG. 7 is a cross sectional view of the cap used in the alternate embodiment of the present invention taken along the longitudinal center of the cap.
Figure 8:
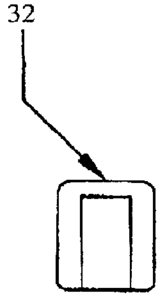
FIG. 8 is a cross sectional view of the cap used in the preferred embodiment of the present invention taken along the longitudinal center of the cap.

The device is assembled as follows. The upper end of guide 30 is placed within the lower end of external housing 26 and slid into the housing 26 until the upper end of the guide 30 extends from the upper end of the external housing 26. At this point, the lower end of the guide will not extend from the lower end of the external housing 26 although, preferably, the ends are flush. The spring 28 is placed in the upper end of the external housing 26, surrounding the guide 30. The cap 32 is then attached to the upper end of the guide 30 through a pressure fit, threading or other means as desired. Following assembly, the device is as shown in FIGS. 3 and 5.

Figure 9:
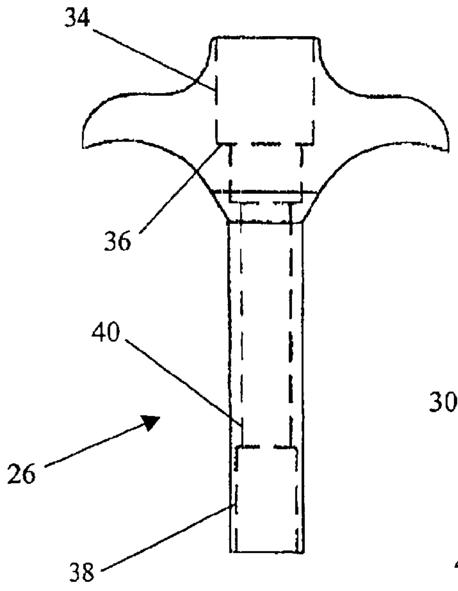
FIG. 9 is a front view of the outer housing of the present invention showing the internal surfaces in dashed lines.
Figure 10:
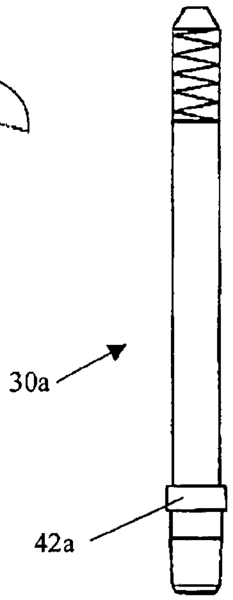
FIG. 10 is a front view of the central cylindrical guide of an alternate embodiment of the present invention.
Figure 11:
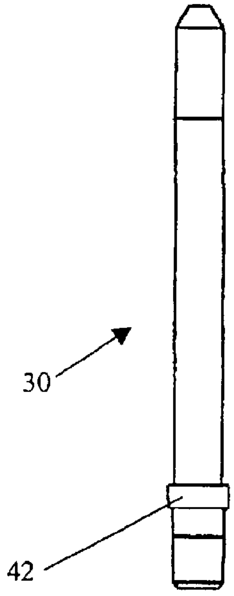
FIG. 11 is a front view of the central cylindrical guide of the preferred embodiment of the present invention.

FIG. 9 shows additional detail concerning the internal surface of the external housing 26. The internal diameter of the upper portion 34 of the external housing 26 is sized to accept the spring 28. Immediately below the upper portion 34 of the external housing 26, the internal diameter is reduced such that the spring 28 is held in the upper portion and is provided a surface 36 to press against.

The lower end of the external housing 26 also includes portions of differing internal diameters. The internal diameter 38 of the bottom end of the external housing 26 accepts the guide 30. Above the bottom end of the external housing 26 is a portion with a reduced internal diameter 40. This reduced internal diameter 40 interacts with a lip 42, 42*a* (shown in FIGS. 10 and 11) on the guide 30 to prevent the guide 30 from sliding entirely through the external housing 26.

The cap, housing 26 and guide 30 are made from durable material which is preferably water resistant and, even more preferably, waterproof, such as plastics or composites. One material used to manufacture the tool is called Acetal, which is an engineering thermoplastic. The material offers a high modulus of elasticity, high strength, and dimensional stability. It has excellent resistance to moisture and is ideal for close tolerance parts (easily machined). Moreover, injection molded materials are particularly preferred in the production of the invention. The spring 28 is a compression spring preferably having a strength of approximately 10.25 lbs.

Figure 4:
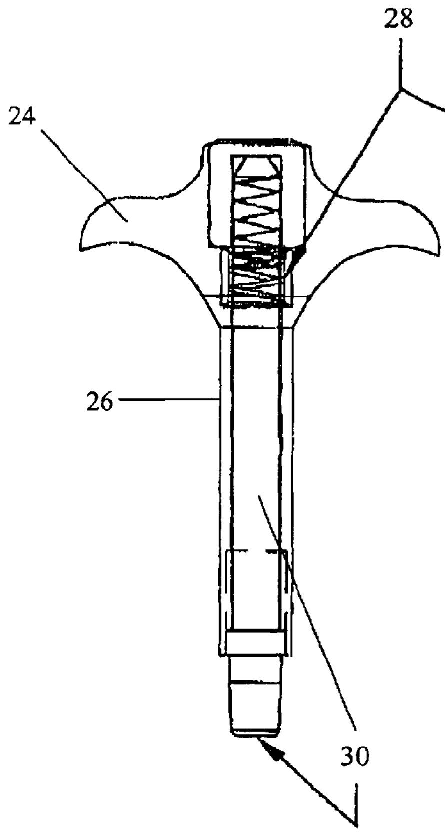
FIG. 4 is a cross sectional view of an alternate embodiment of the present invention taken along the longitudinal center of the device, with the device in its actuated position.

As shown in FIGS. 3 and 5, in the resting position, the lower end of the guide 30 is maintained within the external housing 26 while the upper end of the guide 30 extends from the top of the external housing 26. As shown in FIGS. 2 and 4, when the cap 32 is pressed, the lower end of the guide 30 extends from the external housing 26.

In use, the device is held in one hand during the removal or insertion of the spring 20 and seal 22. The cap 32 is pressed, causing the spring 28 to compress against surface 36 and forcing the guide 30 to extend from the housing 26. In this position, the guide 30 is forced into the center of the worn spring 20 and seal 22. When the device is removed, with the cap 32 still depressed, the worn spring 20 and seal 22 are held on the guide 30 by a friction fit. Once the device is completely removed, the cap 32 can be released, allowing the guide 30 to slide back into the housing 26 while the spring 20 and seal 22 fall off the guide 30.

To install a new spring 20 and seal 22, the cap 32 is depressed to extend the guide 30 from the external housing 26. In this position, the new spring 20 and seal 22 are placed on the guide 30. With the cap 32 still depressed, the spring 20 and seal 22 are placed in the faucet. Once the spring 20 and seal 22 are properly seated, the cap 32 is released thus removing the guide 30 from the spring 20 and seal 22 and leaving them in the proper location. The guide 30 preferably has a tapered end to allow the rubber seal 22 to further up the guide 30 and maintain position while the spring 20 is held on by the diameter at a lower position along the tapered end of the guide 30 with no interference with the rubber seal 22. Both the spring 20 and seal 22 are held into place by separate planes that allow for both to be removed and replaced within the same motion.

In one embodiment of the invention, the external housing 26 performs two functions: (A) the holding action that is required to use the device, and (B) the push and release action to retrieve the old seal 22 and spring 20 and replace with the new seal 22 and spring 20. The push and release action consists of a compression spring 28, cap 32, guide 30 and external housing 26. Guide 30 and cap 32, FIG. 3, are connected and locked into place after assembly. The compression spring 28 allows for the resistance and the pressure to strip the seal 22 and spring 20 from the guide 30. The cap 32 is used to push the guide 30 in a downward motion until the seal 22 and spring 20 are retrieved and released to remove the seal 22 and spring 20.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A device for removing and replacing a seal structure in a plumbing fixture, comprising: a cylindrical, hollow external housing having upper and lower ends; a cylindrical guide having upper and lower ends and designed to be removably disposed within the external housing such that the lower end of the guide does not extend beyond the lower end of the external housing in a resting position; a cap removably attachable to the upper end of the cylindrical guide such that the cap extends beyond the upper end of the external housing in a resting position; and a compression spring having upper and lower ends wherein the lower end of the compression spring is held in place by an area of reduced internal diameter in the external housing and wherein the compression spring is disposed within the upper end of the external housing such that depression of the cap causes compression of the spring and causes the lower end of the cylindrical guide to extend beyond the lower end of the external housing.

2. A device for removing and replacing a seal structure in a plumbing fixture, comprising: a cylindrical, hollow external housing having upper and lower ends; a cylindrical guide having upper and lower ends and designed to be removably disposed within the external housing such that the lower end of the guide does not extend beyond the lower end of the external housing in a resting position; a cap threaded to the upper end of the cylindrical guide such that the cap extends beyond the upper end of the external housing in a resting position; and a compression spring having upper and lower ends and disposed within the upper end of the external housing such that depression of the cap causes compression of the spring and causes the lower end of the cylindrical guide to extend beyond the lower end of the external housing.

3. A device for removing and replacing a seal structure in a plumbing fixture, comprising: a cylindrical, hollow external housing having upper and lower ends and integral grip handles which are curved to accept a user's fingers; a cylindrical guide having upper and lower ends and designed to be removably disposed within the external housing such that the lower end of the guide does not extend beyond the lower end of the external housing in a resting position, the cylindrical guide further including a lip which interacts with an area of reduced internal diameter in the external housing to prevent the cylindrical guide from sliding past a predetermined location; a cap threaded to the upper end of the cylindrical guide such that the cap extends beyond the upper end of the external housing in a resting position; and a compression spring having upper and lower ends and disposed within the upper end of the external housing and held in place by an area of reduced internal diameter in the external housing such that depression of the cap causes compression of the spring and causes the lower end of the cylindrical guide to extend beyond the lower end of the external housing.

* * * * *